United States Patent
Morooka

(10) Patent No.: US 9,540,504 B2
(45) Date of Patent: *Jan. 10, 2017

(54) THERMOPLASTIC RESIN COMPOSITION

(75) Inventor: Naoyuki Morooka, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 411 days.

This patent is subject to a terminal disclaimer.

(21) Appl. No.: 13/203,321

(22) PCT Filed: Mar. 4, 2010

(86) PCT No.: PCT/JP2010/054065
§ 371 (c)(1),
(2), (4) Date: Aug. 25, 2011

(87) PCT Pub. No.: WO2010/110077
PCT Pub. Date: Sep. 30, 2010

(65) Prior Publication Data
US 2011/0305863 A1 Dec. 15, 2011

(30) Foreign Application Priority Data

Mar. 25, 2009 (JP) .................. 2009-074210

(51) Int. Cl.
| | | |
|---|---|---|
| B32B 1/08 | (2006.01) | |
| B32B 27/08 | (2006.01) | |
| C08L 33/02 | (2006.01) | |
| C08L 23/26 | (2006.01) | |
| C08L 77/06 | (2006.01) | |
| C08L 29/04 | (2006.01) | |
| C08L 15/00 | (2006.01) | |
| B32B 7/12 | (2006.01) | |
| B32B 25/08 | (2006.01) | |
| B32B 25/16 | (2006.01) | |
| B32B 27/06 | (2006.01) | |
| B32B 27/28 | (2006.01) | |
| B32B 27/30 | (2006.01) | |
| B32B 27/32 | (2006.01) | |
| B32B 27/34 | (2006.01) | |
| B60C 1/00 | (2006.01) | |
| C08L 77/00 | (2006.01) | |

(Continued)

(52) U.S. Cl.
CPC .................. C08L 15/00 (2013.01); B32B 1/08 (2013.01); B32B 7/12 (2013.01); B32B 25/08 (2013.01); B32B 25/16 (2013.01); B32B 27/06 (2013.01); B32B 27/28 (2013.01); B32B 27/306 (2013.01); B32B 27/308 (2013.01); B32B 27/32 (2013.01); B32B 27/34 (2013.01); B60C 1/0008 (2013.04); C08L 29/04 (2013.01); C08L 77/00 (2013.01); C08L 77/06 (2013.01); F16L 11/06 (2013.01); B32B 2250/24 (2013.01); B32B 2270/00 (2013.01); *B32B 2307/7242* (2013.01); *B32B 2597/00* (2013.01); *B32B 2605/00* (2013.01); *B60C 2005/145* (2013.04); *C08L 51/06* (2013.01); *C08L 2205/03* (2013.01); *Y10T 428/1393* (2015.01); *Y10T 428/31725* (2015.04)

(58) Field of Classification Search
CPC ............ B32B 1/08; B32B 25/08; B32B 25/16; B32B 27/06; B32B 27/28; B32B 27/30; B32B 27/306; B32B 27/308; B32B 27/34; B32B 27/32; B32B 7/12; C08L 15/00; C08L 77/06; C08L 29/04; F16L 11/06; B60C 1/0008
USPC ..... 428/36.91, 474.4; 525/113, 183, 184, 57
See application file for complete search history.

(56) References Cited

U.S. PATENT DOCUMENTS

| | | | | |
|---|---|---|---|---|
| 4,549,593 A | * | 10/1985 | Yahagi et al. ................ | 152/510 |
| 5,047,479 A | * | 9/1991 | Ohmae et al. ................ | 525/183 |
| 5,310,827 A | * | 5/1994 | Komiya et al. ............... | 525/439 |

(Continued)

FOREIGN PATENT DOCUMENTS

| | | |
|---|---|---|
| CN | 101177506 A | 5/2008 |
| CN | 101370652 A | 2/2009 |

(Continued)

OTHER PUBLICATIONS

Baker, W.; Scott, C.; Hu, G.-H. (2001). Reactive Polymer Blending. Hanser Publishers. Online version available at: http://www.knovel.com/web/portal/browse/display?_EXT_KNOVEL_DISPLAY_bookid=998&VerticalID=0.*

*Primary Examiner* — Gwendolyn Blackwell
*Assistant Examiner* — Kevin Ortman, Jr.
(74) *Attorney, Agent, or Firm* — Polsinelli PC

(57) ABSTRACT

Provided is a thermoplastic resin composition in which a modified rubber excellent in low temperature resistance is dispersedly added in a polyamide resin matrix to improve the low temperature resistance (cyclic fatigue resistance) of the polyamide resin, the composition maintaining its fluidity even at a high content of modified rubber, thus allowing film formation, and exhibiting excellent low temperature resistance. The thermoplastic resin composition includes a polyamide resin (A) and a modified rubber (B) having an acid anhydride group or an epoxy group and is characterized in that the modified rubber (B) having an acid anhydride group or an epoxy group is modified with a hydrogen bonding compound (C) having a functional group reacting with an acid anhydride group or an epoxy group and a functional group capable of hydrogen bonding with an amide bond or a hydroxyl group. In addition, the polyamide resin (A) is preferably modified with a compound capable of bonding to a terminal amino group of the polyamide resin. The thermoplastic resin composition is suitably used for production of tires, hoses and the like.

16 Claims, No Drawings

(51) Int. Cl.
  *F16L 11/06* (2006.01)
  *C08L 51/06* (2006.01)

(56) References Cited

U.S. PATENT DOCUMENTS

| | | |
|---|---|---|
| 5,910,544 A | 6/1999 | Ozawa et al. |
| 6,079,465 A | 6/2000 | Takeyama et al. |
| 2006/0189755 A1* | 8/2006 | Chino et al. .................... 525/88 |
| 2008/0045665 A1* | 2/2008 | Chino ........................ 525/329.7 |
| 2008/0103287 A1 | 5/2008 | Chino et al. |
| 2008/0227928 A1* | 9/2008 | Vedage et al. ................ 525/423 |
| 2009/0038729 A1* | 2/2009 | Soeda et al. .................. 152/510 |

FOREIGN PATENT DOCUMENTS

| | | | |
|---|---|---|---|
| EP | 1974907 A1 | * | 10/2008 |
| JP | 55-157650 A | | 12/1980 |
| JP | 10-25375 A | | 1/1989 |
| JP | 8-259741 A | | 10/1996 |
| JP | 10-114840 A | | 5/1998 |
| JP | 11-240108 A | | 9/1999 |
| JP | 2000-160024 A | | 6/2000 |
| JP | 2002-080644 A | | 3/2002 |
| JP | 2007-291301 A | | 11/2007 |
| JP | 2007-326896 A | | 12/2007 |
| JP | 2008-133437 A | | 6/2008 |
| JP | 2008-260887 A | | 10/2008 |
| JP | 2009-057524 A | | 3/2009 |
| WO | WO-2007/043497 A1 | | 4/2007 |
| WO | WO-2007/083785 A1 | | 7/2007 |

* cited by examiner

THERMOPLASTIC RESIN COMPOSITION

CROSS REFERENCE TO RELATED APPLICATIONS

This application is a National Phase filing under 35 U.S.C. §371 of PCT/JP2010/054065 filed on Mar. 4, 2010; and this application claims priority to Application No. 2009-074210 filed in Japan on Mar. 25, 2009 under 35 U.S.C. §119; the entire contents of all are hereby incorporated by reference.

TECHNICAL FIELD

The present invention relates to a thermoplastic resin composition including a polyamide resin and a modified rubber. Particularly, the present invention relates to a thermoplastic resin composition in which the modified rubber is dispersed in a polyamide resin matrix to improve low temperature resistance (cyclic fatigue resistance) of the polyamide resin.

BACKGROUND ART

There is known a thermoplastic elastomer composition prepared by dispersing a specific rubber elastomer component as a discontinuous phase in a specific thermoplastic resin matrix and has a good balance between air permeability resistance and flexibility (JP 8-259741 A).

In addition, a thermoplastic elastomer composition having more flexibility and excellent air permeability resistance by attaining a high elastomer component ratio by setting a melt viscosity (ηm) of a thermoplastic resin component, a melt viscosity (ηd) of an elastomer component in a thermoplastic elastomer composition and a solubility parameter difference (ΔSP) between the elastomer component and the thermoplastic resin component such that they satisfy a specific relational expression, as well as a pneumatic tire in which the thermoplastic elastomer composition is used for a gas permeation preventive layer is known (JP 10-25375 A).

Furthermore, there is also known a thermoplastic elastomer composition in which gas permeability resistance is greatly improved due to the presence of a barrier resin composition having a phase structure dispersed flatly in a thermoplastic elastomer having a continuous phase of a thermoplastic resin and a dispersion phase of a rubber composition, and moreover, which has flexibility, oil resistance, cold resistance and heat resistance (JP 10-114840 A).

Furthermore, there is also known a thermoplastic elastomer composition in which an acid anhydride-modified ethylene-based modifier polymer is blended in an aliphatic polyamide resin modified with a layered silicate (JP 2000-160024 A).

CITATION LIST

Patent Literatures

Patent Literature 1: JP 8-259741 A.
Patent Literature 2: JP 10-25375 A.
Patent Literature 3: JP 10-114840 A.
Patent Literature 4: JP 2000-160024 A.

SUMMARY OF INVENTION

Technical Problem

When a polyamide resin is blended with a modified rubber having an acid anhydride group or an epoxy group, the polyamide resin reacts with the acid anhydride group or the epoxy group. This have caused a problem in which adding a large amount of the modified rubber extremely reduces fluidity in melting, thus significantly deteriorating film formability, and a problem in which the low temperature resistance is still insufficient despite the high content of the modified rubber.

It is an object of the present invention to provide a thermoplastic resin composition in which a modified rubber excellent in low temperature resistance is dispersedly included in a polyamide resin matrix to improve the low temperature resistance (cyclic fatigue resistance) of the polyamide resin, the composition maintaining fluidity even when a large amount of the modified rubber is added so that film formation is possible, and also exhibiting excellent low temperature resistance.

Solution to Problem

The present invention is a thermoplastic resin composition comprising a polyamide resin (A) and a modified rubber (B) having an acid anhydride group or an epoxy group, wherein the modified rubber (B) having an acid anhydride group or an epoxy group is modified with a hydrogen bonding compound (C) having a functional group reacting with an acid anhydride group or an epoxy group and a functional group capable of hydrogen bonding with an amide bond or a hydroxyl group.

In the present invention, preferably, the hydrogen bonding compound (C) having a functional group reacting with an acid anhydride group or an epoxy group and a functional group capable of hydrogen bonding with an amide bond or a hydroxyl group has an amino group, a hydroxyl group, a carboxyl group or a mercapto group as the functional group reacting with an acid anhydride group or an epoxy group and has a sulfone group, a carbonyl group, an ether bond, a hydroxyl group or a nitrogen-containing heterocycle as the functional group capable of hydrogen bonding with an amide bond or a hydroxyl group.

In the present invention, preferably, the polyamide resin (A) is a modified polyamide resin (A') obtained by melt-blending 100 parts by weight of a polyamide resin and 0.05 to 5 parts by weight of a compound (D) capable of bonding to a terminal amino group of the polyamide resin at a temperature equal to or higher than a melting point of the polyamide resin.

Preferably, the thermoplastic resin composition according to the present invention further comprises an ethylene-vinyl alcohol copolymer (E).

Preferably, in the present invention, the compound (D) capable of bonding to a terminal amino group of the polyamide resin is a monofunctional epoxy compound.

Preferably, in the present invention, the polyamide resin (A) is nylon 6 or nylon 666.

Preferably, in the present invention, the modified rubber (B) having an acid anhydride group or an epoxy group is an ethylene-α-olefin copolymer or an ethylene-unsaturated carboxylic acid copolymer or a derivative thereof.

Preferably, in the present invention, the thermoplastic resin composition comprises 100 parts by weight of the polyamide resin (A) and 90 to 180 parts by weight of the modified rubber (B) having an acid anhydride group or an epoxy group.

When the thermoplastic resin composition of the present invention comprises the ethylene-vinyl alcohol copolymer (E), a ratio by weight between the polyamide resin (A) and the ethylene-vinyl alcohol copolymer (E) is preferably 90/10 to 10/90, and the composition comprises 90 to 180 parts by weight of the modified rubber (B) having an acid anhydride group or an epoxy group, based on 100 parts by weight in total of the polyamide resin (A) and the ethylene-vinyl alcohol copolymer (E).

In addition, the present invention is a laminate comprising at least one film of the thermoplastic resin composition and at least one sheet of a diene component-containing rubber composition.

Preferably, the laminate according to the present invention further comprises an adhesive layer.

In the laminate of the present invention, preferably, a polymer component of the rubber composition comprises 30 to 100 percent by weight of a halogenated butyl rubber.

In addition, the present invention is a tire comprising the film of the thermoplastic resin composition or the laminate.

In addition, the present invention is a hose comprising the film of the thermoplastic resin composition or the laminate.

Advantageous Effects of Invention

According to the present invention, the thermoplastic resin composition comprising the polyamide resin (A) and the modified rubber (B) having an acid anhydride group or an epoxy group is modified with the hydrogen bonding compound (C) having the functional group reacting with an acid anhydride group or an epoxy group and the functional group capable of hydrogen bonding with an amide bond or a hydroxyl group, whereby an interface between the polyamide resin forming a matrix and a modified rubber dispersion phase is reinforced by the hydrogen bond. Accordingly, the low temperature resistance of the thermoplastic resin composition can be improved without deteriorating film formability.

Moreover, using, as the polyamide resin (A), the polyamide resin modified with the compound (D) capable of bonding to a terminal amino group of the polyamide resin suppresses the reaction between the modified rubber (B) and a terminal amino group of the polyamide occurring during the blending of the polyamide resin (A) and the modified rubber (B). Thus, hydrogen bond formation can more effectively be achieved on the interface between the matrix resin and the modified rubber dispersion phase. This can further improve the low temperature resistance of the thermoplastic resin composition without deteriorating film formability.

In addition, the film of the thermoplastic resin composition of the present invention and the laminate comprising the film can be used for applications requiring low temperature resistance, such as inner liners for tires and hoses.

DESCRIPTION OF EMBODIMENTS

The thermoplastic resin composition of the present invention includes a polyamide resin (A) and a modified rubber (B) having an acid anhydride group or an epoxy group.

The polyamide resin (A) includes, but is not limited to, nylon 11, nylon 12, nylon 6, nylon 66, nylon 666, nylon 612, nylon 610, nylon 46, nylon 66612 and an aromatic nylon, which can be used alone or as an mixture thereof. Among them, nylon 6 and nylon 666 are preferable in terms of the balance between cyclic fatigue resistance and gas barrier properties.

The modified rubber (B) used in the present invention has an acid anhydride group or an epoxy group. From the viewpoint of the compatibility with the polyamide resin, particularly preferably, the modified rubber (B) has an acid anhydride group.

A rubber forming the modified rubber (B) includes an ethylene-α-olefin copolymer or an ethylene-unsaturated carboxylic acid copolymer or a derivative thereof. Examples of the ethylene-α-olefin copolymer include an ethylene-propylene copolymer, an ethylene-butene copolymer, an ethylene-hexene copolymer and an ethylene-octene copolymer. Examples of the ethylene-unsaturated carboxylic acid copolymer or the derivative thereof include an ethylene-acrylate copolymer, an ethylene-methacrylate copolymer, an ethylene-methyl acrylate copolymer and an ethylene-methyl methacrylate copolymer.

The modified rubber having an acid anhydride group can be produced, for example, by reaction of an acid anhydride and peroxide with rubber. Additionally, the modified rubber having an acid anhydride group is commercially available and thus commercially available rubber can be used. Examples of the commercially available rubber include a maleic anhydride modified ethylene-propylene copolymer (TAFMER® MP-0620) and a maleic anhydride modified ethylene-butene copolymer (TAFMER® MP-7020), manufactured by Mitsui Chemicals, Inc.

The modified rubber having an epoxy group can be produced, for example, by copolymerization of glycidyl methacrylate with rubber. In addition, the modified rubber having an epoxy group is commercially available and thus commercially available rubber can be used. Examples of the commercially available rubber include an epoxy modified ethylene-methyl acrylate copolymer (ESPLENE® EMA2752) manufactured by Sumitomo Chemical Co., Ltd.

A particularly preferable modified rubber (B) is an ethylene-α-olefin copolymer graft-modified with an anhydride group. An example thereof is the above-mentioned maleic anhydride modified ethylene-propylene copolymer (TAFMER® MP-0620) manufactured by Mitsui Chemicals, Inc.

Regarding the ratio between the polyamide resin (A) and the modified rubber (B) in the thermoplastic resin composition, the modified rubber (B) is contained preferably in an amount of 90 to 180 parts by weight, more preferably in an amount of 95 to 160 parts by weight, based on 100 parts by weight of the polyamide resin (A). If the ratio of the modified rubber (B) is too small, the low temperature resistance is reduced, whereas if it is too large, the fluidity in melting extremely reduces, which significantly deteriorates the film formability. In the thermoplastic resin composition of the present invention, preferably, the polyamide resin (A) forms a continuous phase and the modified rubber (B) forms a dispersion phase.

In the thermoplastic resin composition of the present invention, the modified rubber (B) is modified with a hydrogen bonding compound (C) having a functional group reacting with an acid anhydride group or an epoxy group and a functional group capable of hydrogen bonding with an amide bond or a hydroxyl group. By modifying with the hydrogen bonding compound (C), the interface between the matrix-forming resin and the modified rubber dispersion phase is reinforced by the hydrogen bond. Accordingly, the low temperature resistance of the thermoplastic resin composition can be improved without deteriorating the film formability. Modification with the hydrogen bonding compound (C) can be done by melt-blending of the modified rubber having an acid anhydride group or an epoxy group with the hydrogen bonding compound (C). The temperature for melt-blending is equal to or higher than a melting point of the polyamide resin (A), but preferably is a temperature that is 20° C. higher than the melting point of the polyamide resin (A), for example, a temperature of 200 to 250° C. The time for melt-blending is usually 1 to 10 minutes and preferably 2 to 5 minutes.

Examples of the hydrogen bonding compound (C) having a functional group reacting with an acid anhydride group or an epoxy group and a functional group capable of hydrogen bonding to an amide bond or a hydroxyl group include compounds having an amino group, a hydroxyl group, a carboxyl group or a mercapto group as the functional group reacting with an acid anhydride group or an epoxy group and has a sulfone group, a carbonyl group, an ether bond, a hydroxyl group or a nitrogen-containing heterocycle as the functional group capable of hydrogen bonding with an amide bond or a hydroxyl group. Among them, preferred are compounds having an amino group and/or a hydroxyl group as the functional group reacting with an acid anhydride group or an epoxy group and having a sulfone group, a carbonyl group and/or a nitrogen-containing heterocycle as the functional group capable of hydrogen bonding with an amide bond or a hydroxyl group. Examples of the compounds having an amino group and/or a hydroxyl group as the functional group reacting with an acid anhydride group or an epoxy group and having a sulfone group, a carbonyl group and/or a nitrogen-containing heterocycle as the functional group capable of hydrogen bonding with an amide bond or a hydroxyl group include 3,3'-diaminodiphenyl sulfone, 4,4'-diaminodiphenyl sulfone, 1,3-bis(3-aminophenoxy)benzene, 3,3'-diamino-4,4'-dihydroxydiphenyl sulfone, (4-(4-aminobenzoyl)oxyphenyl)-4-aminobenzoate, 3-amino-1,2,4-triazole and tris(2-hydroxyethyl)isocyanurate. Among them, in terms of improvement in cost, safety and low temperature resistance, preferred are 3,3'-diaminodiphenyl sulfone, tris(2-hydroxyethyl)isocyanurate and 3-amino-1,2,4-triazole.

When a compound having two or more amino groups is used as the hydrogen bonding compound (C), the compound also serves as a cross-linking agent. By melt-blending the modified rubber with the compound, the modified rubber is dynamically cross-linked and the viscosity of the modified rubber phase further increases compared to the resin phase. This seems to also be effective in promoting formation of the modified rubber phase into an island phase to stabilize the dispersion state of the modified rubber in the thermoplastic resin composition. As a result, micro-dispersion of the modified rubber is maintained, whereby there can be obtained the thermoplastic resin composition that maintains fluidity even when a large amount of the modified rubber is added so that film formation is possible and that exhibits excellent low temperature resistance.

The amount of the hydrogen bonding compound (C) having the functional group reacting with an acid anhydride group or an epoxy group and the functional group capable of hydrogen bonding with an amide bond or a hydroxyl group is preferably 0.1 to 5 parts by weight, more preferably 0.5 to 3 parts by weight, based on 100 parts by weight of the modified rubber (B). If the amount of the hydrogen bonding compound (C) is too small, reinforcement of the interface between the matrix resin and the dispersion rubber by hydrogen bonding becomes insufficient, so that the micro-dispersion of the modified rubber (B) cannot be maintained and thus its durability and gas barrier properties are degraded. Conversely, in the case of an excessive amount of the hydrogen bonding compound (C), the durability is also degraded, which is unfavorable.

The polyamide resin (A) used in the present invention is, preferably, a modified polyamide resin (A') obtained by melt-blending 100 parts by weight of the polyamide resin and 0.05 to 5 parts by weight of a compound (D) capable of bonding to a terminal amino group of the polyamide resin at a temperature equal to or higher than the melting point of the polyamide resin.

Examples of the compound (D) capable of bonding to a terminal amino group of the polyamide resin include monofunctional epoxy compounds, isocyanate group-containing compounds, acid anhydride group-containing compounds and halogenated alkyl group-containing compounds. From the viewpoint of reactivity with a terminal amino group of the polyamide resin, preferred are monofunctional epoxy compounds.

Examples of the monofunctional epoxy compounds include ethylene oxide, epoxy propane, 1,2-epoxybutane, 2,3-epoxybutane, 3-methyl-1,2-epoxybutane, 1,2-epoxypentane, 4-methyl-1,2-epoxypentane, 2,3-epoxypentane, 3-methyl-1,2-epoxypentane, 4-methyl-1,2-epoxypentane, 4-methyl-2,3-epoxypentane, 3-ethyl-1,2-epoxypentane, 1,2-epoxyhexane, 2,3-epoxyhexane, 3,4-epoxyhexane, 5-methyl-1,2-epoxyhexane, 4-methyl-1,2-epoxyhexane, 5-methyl-1,2-epoxyhexane, 3-ethyl-1,2-epoxyhexane, 3-propyl-1,2-epoxyhexane, 4-ethyl-1,2-epoxyhexane, 5-methyl-1,2-epoxyhexane, 4-methyl-2,3-epoxyhexane, 4-ethyl-2,3-epoxyhexane, 2-methyl-3,4-epoxyhexane, 2,5-dimethyl-3,4-epoxyhexane, 3-methyl-1,2-epoxyheptane, 4-methyl-1,2-epoxyheptane, 5-methyl-1,2-epoxyheptane, 6-methyl-1,2-epoxyheptane, 3-ethyl-1,2-epoxyheptane, 3-propyl-1,2-epoxyheptane, 3-butyl-1,2-epoxyheptane, 4-propyl-2,3-epoxyheptane, 5-ethyl-1,2-epoxyheptane, 4-methyl-2,3-epoxyheptane, 4-ethyl-2,3-epoxyheptane, 4-propyl-2,3-epoxyheptane, 2-methyl-3,4-epoxyheptane, 5-methyl-3,4-epoxyheptane, 6-ethyl-3,4-epoxyheptane, 2,5-dimethyl-3,4-epoxyheptane, 2-methyl-5-ethyl-3,4-epoxyheptane, 1,2-epoxyheptane, 2,3-epoxyheptane, 3,4-epoxyheptane, 1,2-epoxyoctane, 2,3-epoxyoctane, 3,4-epoxyoctane, 4,5-epoxyoctane, 1,2-epoxynonane, 2,3-epoxynonane, 3,4-epoxynonane, 4,5-epoxynonane, 1,2-epoxydecane, 2,3-epoxydecane, 3,4-epoxydecane, 4,5-epoxydecane, 5,6-epoxydecane, 1,2-epoxyundecane, 2,3-epoxyundecane, 3,4-epoxyundecane, 5,6-epoxyundecane, 1,2-epoxydodecane, 2,3-epoxydodecane, 3,4-epoxydodecane, 4,5-epoxydodecane, 5,6-epoxydodecane, 6,7-epoxydodecane, epoxyethylbenzene, 1-phenyl-1,2-epoxypropane, 3-phenyl-1,2-epoxypropane, 1-phenyl-1,2-epoxybutane, 3-phenyl-1,2-epoxybutane, 4-phenyl-1,2-epoxybutane, 3-phenyl-1,2-epoxypentane, 4-phenyl-1,2-epoxypentane, 5-phenyl-1,2-epoxypentane, 1-phenyl-1,2-epoxyhexane, 3-phenyl-1,2-epoxyhexane, 4-phenyl-1,2-epoxyhexane, 5-phenyl-1,2-epoxyhexane, 6-phenyl-1,2-epoxyhexane, glycidol, 3,4-epoxy-1-butanol, 4,5-epoxy-1-pentanol, 5,6-epoxy-1-hexanol, 6,7-epoxy-1-heptanol, 7,8-epoxy-1-octanol, 8,9-epoxy-1-nonanol, 9,10-epoxy-1-decanol, 10,11-epoxy-1-undecanol, 3,4-epoxy-2-butanol, 2,3-epoxy-1-butanol, 3,4-epoxy-2-pentanol, 2,3-epoxy-1-pentanol, 1,2-epoxy-3-pentanol, 2,3-epoxy-4-methyl-1-pentanol, 2,3-epoxy-4,4-dimethyl-1-pentanol, 2,3-epoxy-1-hexanol, 3,4-epoxy-2-hexanol, 4,5-epoxy-3-hexanol, 1,2-epoxy-3-hexanol, 2,3-epoxy-4-methyl-1-hexanol, 2,3-epoxy-4-ethyl-1-hexanol, 2,3-epoxy-4,4-dimethyl-1-hexanol, 2,3-epoxy-4,4-diethyl-1-hexanol, 2,3-epoxy-4-methyl-1-hexanol, 3,4-epoxy-5-methyl-2-hexanol, 3,4-epoxy-5,5-dimethyl-2-hexanol, 3,4-epoxy-3-heptanol, 2,3-epoxy-1-heptanol, 4,5-epoxy-3-heptanol, 2,3-epoxy-4-heptanol, 1,2-epoxy-3-heptanol, 2,3-epoxy-1-octanol, 3,4-epoxy-3-octanol, 4,5-epoxy-3-octanol, 5,6-epoxy-4-octanol, 2,3-epoxy-4-octanol, 1,2-epoxy-3-octanol, 2,3-epoxy-1-nonanol, 3,4-epoxy-2-nonanol, 4,5-epoxy-3-nonanol, 5,6-epoxy-5-nonanol, 3,4-epoxy-5-nonanol, 2,3-epoxy-4-nonanol, 1,2-epoxy-3-nonanol, 2,3-epoxy-1-decanol, 3,4-epoxy-2-decanol, 4,5-epoxy-3-decanol, 5,6-epoxy-4-decanol, 6,7-epoxy-5-decanol, 3,4-epoxy-5-decanol, 2,3-epoxy-4-decanol, 1,2-epoxy-3-decanol, 1,2-epoxycyclopentane, 1,2-epoxycyclohexane, 1,2-epoxycycloheptane, 1,2-epoxycyclooctane, 1,2-epoxycyclononane, 1,2-epoxycyclodecane, 1,2-epoxycycloundecane, 1,2-epoxycyclododecane, 3,4-epoxycyclopentene, 3,4-epoxycyclohexene, 3,4-epoxycycloheptene, 3,4-epoxycyclooctene, 3,4-epoxycyclononene, 1,2-epoxycyclodecene, 1,2-epoxycycloundecene, 1,2-epoxycyclododecene, 1-butoxy-2,3-epoxypropane, 1-allyloxy-2,3-epoxypropane, polyethylene glycol butyl glycidyl ether, 2-ethylhexyl glycidyl ether, phenyl glycidyl ether and p-sec-butyl phenyl glycidyl ether. From the viewpoint of the compatibility of the polyamide resin, particularly preferred are epoxy compounds having 3 to 20 carbon atoms, preferably 3 to 13 carbon atoms, and having an ether group and/or a hydroxyl group.

The method for melt-blending the polyamide resin with the compound (D) capable of bonding to a terminal amino group of the polyamide resin is not particularly limited. For example, the polyamide resin and the compound (D) capable of bonding to a terminal amino group of the polyamide resin are fed in a biaxial kneader to be melt-blended at a temperature equal to or higher than the melting point of the polyamide resin, preferably at a temperature that is 20° C. higher than the melting point thereof, for example, at 240° C. The time for melt-blending is, for example, 1 to 10 minutes, and preferably 2 to 5 minutes.

When a monofunctional epoxy compound is melt-blended as the compound (D) capable of bonding to a terminal amino group of the polyamide resin, the monofunctional epoxy compound represented by the following formula (1) bonds to a terminal amino group of the polyamide resin.

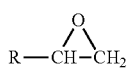

(1)

For example, the terminal amino group changes as follows.

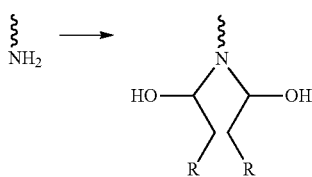

(2)

As a result of this reaction, a part of or all of the terminal amino groups of the polyamide resin changes to another group. Accordingly, even when a large amount of the modified rubber (B) having an acid anhydride group or an epoxy group is added, the fluidity can be maintained, thus allowing film formation.

The amount of the compound (D) capable of bonding to a terminal amino group of the polyamide resin, which is to be used for modification of the polyamide resin, is 0.05 to 5 parts by weight, preferably 1 to 3 parts by weight, based on 100 parts by weight of the polyamide resin. If the amount of the compound (D) capable of bonding to a terminal amino group of the polyamide resin is too small, the fluidity improving effect is reduced due to the addition of the large amount of the modified rubber (B), which is thus unfavorable. Conversely, if the amount of the compound (D) is too large, the low temperature resistance (cyclic fatigue resistance) of the polyamide resin is deteriorated, which is thus unfavorable.

Preferably, the thermoplastic resin composition of the present invention further comprises an ethylene-vinyl alcohol copolymer (E). Adding the ethylene-vinyl alcohol copolymer (E) can improve the gas barrier properties of the thermoplastic resin composition. The ethylene-vinyl alcohol copolymer (E) to be used is not specifically limited and can be a commercially available product, such as EVAL manufactured by Kuraray Co., Ltd., and SOANOL manufactured by Nippon Synthetic Chemical Industry Co., Ltd.

When the thermoplastic resin composition of the present invention comprises the ethylene-vinyl alcohol copolymer (E), the ratio by weight between the polyamide resin (A) and the ethylene-vinyl alcohol copolymer (E) is preferably 90/10 to 10/90, and more preferably 80/20 to 20/80. If the content of the ethylene-vinyl alcohol copolymer (E) is small, little improvement can be seen in the gas barrier properties, and conversely if it is large, the low temperature resistance is extremely deteriorated, which is thus unfavorable.

When the thermoplastic resin composition of the present invention comprises the ethylene-vinyl alcohol copolymer (E), the amount of the modified rubber (B) to be added is preferably 90 to 180 parts by weight, more preferably 95 to 160 parts by weight, based on 100 parts by weight in total of the polyamide resin (A) and the ethylene-vinyl alcohol copolymer (E). If the ratio of the modified rubber (B) is too small, the low temperature resistance is degraded, and conversely if it is too large, the fluidity in melting extremely reduces, which significantly deteriorates the film formability.

The thermoplastic resin composition of the present invention can be produced by melt-blending the polyamide resin (A) and the modified rubber (B). When the thermoplastic resin composition of the present invention comprises the ethylene-vinyl alcohol copolymer (E), the thermoplastic resin composition of the invention can be produced by melt-blending the polyamide resin (A), the ethylene-vinyl alcohol copolymer (E) and the modified rubber (B).

Additionally, without using the modified rubber (B) previously modified with the hydrogen bonding compound (C), the thermoplastic resin composition of the present invention can also be produced by melt-blending the polyamide resin (A), a modified rubber having an acid anhydride group or an epoxy group that is not modified with the hydrogen bonding compound (C) (hereinafter referred to also as "modified rubber ($B_0$)"), and the hydrogen bonding compound (C). When the thermoplastic resin composition of the invention comprises the ethylene-vinyl alcohol copolymer (E), the thermoplastic resin composition thereof can also be produced by melt-blending the polyamide resin (A), the ethylene-vinyl alcohol copolymer (E), the modified rubber ($B_0$) and the hydrogen bonding compound (C).

The hydrogen bonding compound (C) may be added simultaneously with melt-blending of the polyamide resin (A) and the modified rubber ($B_0$) or may be added after the melt-blending thereof. In other words, the polyamide resin (A), the modified rubber ($B_0$) and the hydrogen bonding compound (C) may be simultaneously melt-blended, or when the modified rubber ($B_0$) is sufficiently dispersed after melt-blending the polyamide resin (A) and the modified rubber ($B_0$), the hydrogen bonding compound (C) may be added to be further melt-blended. Preferably, when the modified rubber ($B_0$) is sufficiently dispersed after the melt-blending of the polyamide resin (A) and the modified rubber ($B_0$), the hydrogen bonding compound (C) is added to be further melt-blended.

The temperature for melt-blending is a temperature equal to or higher than the melting point of the polyamide resin, but preferably a temperature that is 20° C. higher than the melting point of the polyamide resin, for example, 200 to 250° C. The time for melt-blending is usually 1 to 10 minutes and preferably 2 to 5 minutes.

In the case in which the modified polyamide resin (A') is used as the polyamide resin (A), the modified polyamide resin (A') is previously prepared by melt-blending 100 parts by weight of the polyamide resin and 0.05 to 5 parts by weight of the compound (D) capable of bonding to a terminal amino group of the polyamide resin. Then, the modified polyamide resin (A') is melt-blended with the modified rubber (B) previously modified with the hydrogen bonding compound (C) or melt-blended with the modified rubber ($B_0$) and the hydrogen bonding compound (C), whereby the thermoplastic resin composition of the present invention can be produced.

When the thermoplastic resin composition of the present invention comprises the ethylene-vinyl alcohol copolymer (E), preferably, the ethylene-vinyl alcohol copolymer (E) is added simultaneously with the polyamide resin (A) or the modified polyamide resin (A').

In the case of adding a plasticizer, although the timing for adding the plasticizer is not specifically limited, it is preferable to previously add the plasticizer to the polyamide resin (A) or the modified polyamide resin (A') to knead them together.

A typical method for producing the thermoplastic resin composition of the present invention is, for example, as follows.

First, the polyamide resin, the compound (D) capable of bonding to a terminal amino group of the polyamide resin and the plasticizer are kneaded in a biaxial kneader at a predetermined temperature of 200 to 250° C. for 1 to 10 minutes to prepare the modified polyamide resin (A'). Next, the prepared modified polyamide resin (A') and the modified rubber ($B_0$) are fed in the biaxial kneader with the predetermined temperature of 200 to 250° C. After dispersion of the modified rubber ($B_0$), the hydrogen bonding compound (C) is fed to modify the modified rubber ($B_0$), and finally, other additives are added.

When the thermoplastic resin composition of the present invention comprises the ethylene-vinyl alcohol copolymer (E), for example, the polyamide resin, the compound (D) capable of bonding to a terminal amino group of the polyamide resin and the plasticizer are kneaded in the biaxial kneader at the predetermined temperature of 200 to 250° for 1 to 10 minutes to prepare the modified polyamide resin (A'). Next, the prepared modified polyamide resin (A'), the ethylene-vinyl alcohol copolymer (E) and the modified rubber ($B_0$) are fed in the biaxial kneader with the predetermined temperature of 200 to 250°. The modified rubber ($B_0$) is dispersed, followed by feeding the hydrogen bonding compound (C) to modify the modified rubber ($B_0$), and finally by adding another additive(s).

In addition to the above-described components, to the thermoplastic resin composition of the present invention, there can be added various kinds of additives generally contained in resin and rubber compositions, including a reinforcing agent (filler) such as carbon black or silica, a vulcanizing agent or a cross-linking agent, a vulcanization accelerator or a cross-linking accelerator, a plasticizer, various kinds of oils and an aging preventing agent. The amounts of these additives to be added can be set to conventionally common addition amounts as long as they do not depart from the intended purposes of the invention.

The thermoplastic resin composition of the present invention can be formed into a film by a T-die equipped extruder, an inflation molding apparatus or the like. The film can be suitably used as an inner liner for pneumatic tires because of its excellent gas barrier properties, heat resistance and bending fatigue resistance. Additionally, the film can be formed into a laminate by laminating with a sheet of a diene component-containing rubber composition.

The laminate according to the present invention comprises at least one film of the thermoplastic resin component and at least one sheet of the diene component-containing rubber composition. Examples of rubber forming the diene component-containing rubber composition include natural rubber, emulsion-polymerized styrene-butadiene rubber, solution-polymerized styrene-butadiene rubber, high cis-butadiene rubber, low cis-butadiene rubber, isoprene rubber, acrylonitrile butadiene rubber, hydrogenated nitrile rubber, butyl rubber, halogenated butyl rubber and chloroprene rubber. Among them, halogenated butyl rubber is preferable in that it directly adheres, by applying heat, to the film made of the thermoplastic resin composition obtained by the present invention. Preferably, a polymer component of the rubber composition contains 30 to 100 percent by weight of halogenated butyl rubber. If the content of the halogenated butyl rubber is small, the rubber composition cannot directly adhere by heat to the film of the thermoplastic resin composition of the present invention, and thus needs to be adhered thereto by the intermediary of an adhesive or the like, which is thus unfavorable.

Preferably, the laminate of the present invention further comprises an adhesive layer. The adhesive layer is preferably provided on the rubber composition sheet. Providing the adhesive layer is advantageous in terms of improvement in close contact and adhesion with the rubber composition sheet in a lamination step. Examples of an adhesive forming the adhesive layer include blends of polymers having a functional group that reacts with the polyamide resin (A), the modified polyamide resin (A') or the modified rubber (B) and tackifying resins. Among them, preferred are blends of epoxidized styrene-butadiene-styrene block copolymers and terpene resins.

To the diene-containing rubber composition, in addition to the above-described components, there can be added various kinds of additives generally contained in resin and rubber compositions, including a reinforcing agent (filler) such as carbon black or silica, a vulcanizing agent or a cross-linking agent, a vulcanization accelerator or a cross-linking accelerator, a plasticizer, various kinds of oils and an aging preventing agent. The amounts of these additives to be added can be set to conventionally amounts as long as they do not depart from the intended purposes of the invention.

The tire according to the present invention is a tire comprising a film of the thermoplastic resin composition or the laminate, and preferably a pneumatic tire. The tire can be produced by a conventional method. For example, in the case of using the film of the thermoplastic resin composition of the present invention as an inner liner for a pneumatic tire, the thermoplastic resin composition thereof is previously extruded in a film shape having a predetermined width and a predetermined thickness to be attached onto a tire molding drum in a cylindrical form. Thereon are sequentially attached members used in usual tire production, such as a carcass layer, a belt layer and a tread layer made of unvulcanized rubber, and then the drum is removed to obtain a green tire. Next, by heat vulcanization of the green tire according to a usual method, an intended pneumatic tire can be produced.

The hose according to the present invention is a hose comprising a film of the thermoplastic resin composition or the laminate. A method for producing the hose by using the thermoplastic resin composition of the invention can be a conventional method. For example, the hose can be produced as follows. First, using a pellet of the thermoplastic resin composition of the present invention, the thermoplastic resin composition is extruded on a mandrel where a release agent has been previously applied, by a crosshead extrusion method using a resin extruder, whereby an inner tube is formed. Then, on the inner tube may be formed an inner-tube outside layer by extruding another thermoplastic resin composition of the present invention or a common thermoplastic rubber composition. Next, if needed, an adhesive is applied on the inner tube by spraying, etc. In addition, a reinforcing thread or a reinforcing steel wire is braided on the inner tube by using a braiding machine. If needed, after applying the adhesive on the reinforcement layer for adhesion with an outer tube, the thermoplastic resin composition of the present invention or another common thermoplastic rubber composition is similarly extruded by the crosshead resin extrusion machine to form the outer tube. Finally, the mandrel is drawn out to obtain the hose. Examples of the adhesive applied on the inner tube or the reinforcement layer include those based on isocyanate, urethane, phenol resin, resorcin, chlorinated rubber and HRH, and particularly preferred are isocyanate-based and urethane-based adhesives.

EXAMPLES (1) Raw Materials

The following two kinds of materials were used as the polyamide resin.

Nylon 6: "UBE NYLON" 1022B, which is Nylon 6 manufactured by Ube Industries, Ltd.

Nylon 666: "UBE NYLON" 5033B manufactured by Ube Industries, Ltd.

The following products were used as the modified rubber.

A maleic anhydride modified ethylene-propylene copolymer: TAFMER® MP-0620 manufactured by Mitsui Chemicals Inc. Hereinafter it is also referred to as "MA-EPM".

A maleic anhydride modified ethylene-butene copolymer: TAFMER® MP-7020 manufactured by Mitsui Chemicals Inc. Hereinafter it is also referred to as "MA-EBM".

The following compounds were used as the hydrogen bonding compound (C) having a functional group reacting with an acid anhydride group or an epoxy group and a functional group capable of hydrogen bonding to an amide bond or a hydroxyl group.

3,3'-diaminodiphenyl sulfone: 3,3'-DAS manufactured by Mitsui Fine Chemicals, Inc.

Tris(2-hydroxyethyl)isocyanurate: TANAC® manufactured by Nissei Corporation.

3,-amino-1,2,4-triazole: 3AT manufactured by Otsuka Chemical Co., Ltd.

The following two kinds of compounds were used as the compound (D) capable of bonding to a terminal amino group of the polyamide resin.

Glycidol: EPIOL® OH manufactured by NOF Corp.

p-sec-butylphenyl glycidyl ether: EPIOL® SB manufactured by NOF Corp.

As the ethylene-vinyl alcohol copolymer (E), SOANOL® A4412B manufactured by Nippon Synthetic Chemical Industry Co., Ltd. was used.

As the plasticizer, n-butylbenzensulfonamide (BM-4 manufactured by Daihachi Chemical Industry Co., Ltd.) was used.

(2) Preparation of Modified Polyamide Resin

The polyamide resin, the compound (D) capable of bonding to a terminal amino group of the polyamide resin and the plasticizer were fed in a biaxial kneader (TEX44 manufactured by The Japan Steel Works, Ltd.) with ratios by weight shown in Table 1 to be melt-blended at a kneader temperature of 230° C., thereby preparing five kinds of modified polyamide resins MPA-1, MPA-2, MPA-3, MPA-4 and MPA-5. Additionally, without adding the compound (D) capable of bonding to a terminal amino group of the polyamide resin, under the same conditions, an unmodified polyamide resin PA-1 was prepared.

TABLE 1

|  |  | MPA-1 | MPA-2 | MPA-3 | MPA-4 | MPA-5 | PA-1 |
| --- | --- | --- | --- | --- | --- | --- | --- |
| Nylon 6 | wt parts | 100 |  | 100 | 100 | 100 | 100 |
| Nylon 666 | wt parts |  | 100 |  |  |  |  |
| Glycidol | wt parts | 1 | 1 |  |  |  |  |
| p-sec-butylphenyl glycidyl ether | wt parts |  |  | 1 | 0.01 | 6 |  |
| n-butylbenzensulfonamide | wt parts | 30 | 30 | 30 | 30 | 30 | 30 |
| Total | wt parts | 131 | 131 | 131 | 130.01 | 136 | 130 |

(3) Preparation of Thermoplastic Resin Compositions

The polyamide resin or the modified polyamide resin prepared as above and the maleic anhydride modified ethylene-propylene copolymer or the maleic anhydride modified ethylene-butene copolymer were fed in the biaxial kneader with ratios by weight shown in Tables 2 and 3 to be melt-blended at a kneader temperature of 220° C. When the maleic anhydride modified ethylene-propylene copolymer or the maleic anhydride modified ethylene-butene copolymer was dispersed, 3,3'-diaminodiphenyl sulfone, tris(2-hydroxyethyl)isocyanurate or 3-amino-1,2,4-triazole in an amount shown in Tables 2 and 3 was fed to be melt-blended. After that, the resultant products were continuously discharged from the extruder in a strand shape, then cooled down with water and cut with a cutter into pellets of the thermoplastic resin compositions.

Furthermore, the polyamide resin or the modified polyamide resin prepared as above, the ethylene-vinyl alcohol copolymer and the maleic anhydride modified ethylene-propylene copolymer or the maleic anhydride modified ethylene-butene copolymer were fed in the biaxial kneader with ratios by weight shown in Table 4 to be melt-blended at the kneader temperature of 220° C. Following the dispersion of the maleic anhydride modified ethylene-propylene copolymer or the maleic anhydride modified ethylene-butene copolymer, 3,3'-diaminodiphenyl sulfone, tris(2-hydroxyethyl)isocyanurate or 3-amino-1,2,4-triazole in amounts shown in Table 4 was fed to be melt-blended. Then, the resultant products were continuously discharged from the extruder in a strand shape, cooled down with water and cut with the cutter into pellets of the thermoplastic resin compositions.

(4) Methods for Evaluating Thermoplastic Resin Compositions

Regarding the obtained thermoplastic resin compositions, melt viscosity, morphology, mean particle diameter of the dispersion phase, film formability, −20° C. constant strain test (mean numbers of fractures) and air permeability were evaluated by the following methods.

[Melt Viscosity]

Melt viscosity refers to the melt viscosity of a component at an arbitrary temperature in kneading process. The melt viscosity of each polymer material depends on temperature, shear rate and shear stress. Therefore, measurements were performed for the stress and shear rate of the polymer material at an arbitrary temperature where the material is generally in a molten state such that it flows in a small tube, particularly within a temperature range during kneading. A melt viscosity η is measured by the following equation.

η=shear stress/sheer rate

In the present invention, there was used CAPILLOGRAPE 1C, a capillary rheometer manufactured by Toyo Seiki Seisaku-sho, Ltd., to measure the melt viscosities (Pa·s) of the thermoplastic resin compositions at 250° C. and a shear rate of 250 sec$^{-1}$. From the viewpoint of film formability, the melt viscosity is preferably 1800 Pa·s or lower.

[Morphology and Mean Particle Diameter of Dispersion Phase]

The thermoplastic resin compositions were frozen at −100° C., and the samples were cut with a microtome to expose a fresh surface. Then, the surfaces were observed with an atomic force microscope (SPA-300HV manufactured by SII Nanotechnology Inc.) to measure the morphology and the mean particle diameter (μm) of the dispersion phase.

[Film Formability]

The pellet-shaped thermoplastic resin compositions were formed into films with a mean thickness of 150 μm by a 40-mmϕ monoaxial extruder equipped with a 550 mm-width T-die (manufactured by Pla Giken Co., Ltd.) under extrusion conditions of extrusion temperatures: C1/C2/C3/C4/die=200/210/230/235/235° C., a cooling roll temperature of 50° C. and a take-up speed of 4 m/minute. The term "good" represented a case in which film formation was easy; the term "ordinary" represented a case in which film formation was possible, although it was not easy due to its high viscosity; and the term "poor" represented the case of impossible film formation.

[−20° C. Constant Strain Test (Mean Number of Fractures)]

The pellet-shaped thermoplastic resin compositions were formed into sheets with a mean thickness of 1 mm by using a 40-mmϕ monoaxial extruder equipped with a 200 mm-width T-die (manufactured by Pla Giken Co., Ltd.) under extrusion conditions of the extrusion temperatures: C1/C2/C3/C4/die=200/210/230/235/235° C., the cooling roll temperature of 50° C., and a take-up speed of 0.7 m/minute. Then, the sheets were cut with a JIS #3 dumbbell and subjected to repetitive deformation of 40% at −20° C. Measurements were performed five times to calculate a mean value of the numbers of fractures, thereby determining a mean number of fractures. The sheets in which the mean number of fractures was 1 million or more were evaluated as pass, and the sheets having the mean number thereof of below 1 million were evaluated as fail.

[Air Permeability]

The pellet-shaped thermoplastic resin compositions were formed into films with a mean thickness of 0.15 mm by using a 40-mmϕ monoaxial extruder equipped with a 400 mm-width T-die (manufactured by Pla Giken Co., Ltd.) under extrusion conditions of the extrusion temperatures: C1/C2/C3/C4/die=200/210/230/235/235° C., the cooling roll temperature of 50° C. and a take-up speed of 3 m/minute. Next, the films were dried at 150° C. for 3 hours or longer to measure the air permeability of the thermoplastic resin composition films at a test temperature of 30° C. using an air ($N_2:O_2$=8:2) as a test gas according to JIS K7126 "An air permeability test method of plastic films and sheets (Method A)".

In the case of using the film as an inner liner for tires, the air permeability is preferably $20\times10^{-12}$ cc·cm/cm$^2$·sec·cmHg or lower, and more preferably $15\times10^{-12}$ cc·cm/cm$^2$·sec·cmHg or lower.

An air permeability of $20\times10^{-12}$ cc·cm/cm$^2$·sec·cmHg or lower was evaluated as pass, whereas an air permeability of more than $20\times10^{12}$ cc·cm/cm$^2$·sec·cmHg was evaluated as fail.

(5) Evaluation Results of Thermoplastic Resin Compositions

Tables 2 to 4 show evaluation results.

TABLE 2

|  |  | Ex. 1 | Ex. 2 | Ex. 3 | Ex. 4 | Ex. 5 | Ex. 6 |
|---|---|---|---|---|---|---|---|
| MPA-1 | [wt parts] |  |  | 131 | 131 |  |  |
| MPA-2 | [wt parts] |  |  |  |  | 131 |  |
| MPA-3 | [wt parts] |  |  |  |  |  | 131 |
| MPA-4 | [wt parts] |  |  |  |  |  |  |
| MPA-5 | [wt parts] |  |  |  |  |  |  |
| PA-1 | [wt parts] | 130 | 130 |  |  |  |  |
| Maleic anhydride modified ethylene-propylene copolymer | [wt parts] | 105 | 105 | 105 | 160 | 140 | 140 |
| Maleic anhydride modified ethylene-butene copolymer | [wt parts] |  |  |  |  |  |  |
| 3,3'-diaminodiphenyl sulfone | [wt parts] | 1.4 |  | 1.05 | 1.6 | 1.4 | 1.4 |
| Tris(2-hydroxyethyl)isocyanurate | [wt parts] |  | 2.1 |  |  |  |  |
| 3-amino-1,2,4-triazole | [wt parts] |  |  |  |  |  |  |
| Total | [wt parts] | 236.4 | 237.1 | 237.05 | 292.6 | 272.4 | 272.4 |

TABLE 2-continued

|  |  |  |  |  |  |  |
|---|---|---|---|---|---|---|
| Amount of modified rubber based on 100 parts by weight of polyamide resin | [wt parts] | 105 | 105 | 105 | 160 | 140 | 140 |
| Amount of compound (D) based on 100 parts by weight of polyamide resin | [wt parts] | 0 | 0 | 1 | 1 | 1 | 1 |
| Melt viscosity | [Pa · s] | 6380 | 6380 | 1230 | 1670 | 1540 | 1450 |
| Morphology |  | Good | Good | Good | Good | Good | Good |
| Mean particle diameter of dispersion phase | [μm] | 0.4 | 0.4 | 0.7 | 1.2 | 0.6 | 0.6 |
| Film formability −20° C. constant strain test | [million times] | Ordinary 240 (pass) | Ordinary 300 (pass) | Good 272 (pass) | Good 405 (pass) | Good 354 (pass) | Good 510 (pass) |
| Air permeability | [$10^{-2}$ cc · cm/ cm² · sec · cmHg] | 6.2 (pass) | 6.2 (pass) | 6.7 (pass) | 12.5 (pass) | 11.5 (pass) | 11.2 (pass) |

|  |  | Ex. 7 | Ex. 8 | Ex. 9 | Ex. 10 | Ex. 11 |
|---|---|---|---|---|---|---|
| MPA-1 | [wt parts] |  |  |  | 131 | 131 |
| MPA-2 | [wt parts] |  |  |  |  |  |
| MPA-3 | [wt parts] | 131 | 131 | 131 |  |  |
| MPA-4 | [wt parts] |  |  |  |  |  |
| MPA-5 | [wt parts] |  |  |  |  |  |
| PA-1 | [wt parts] |  |  |  |  |  |
| Maleic anhydride modified ethylene-propylene copolymer | [wt parts] | 140 | 140 | 120 | 100 |  |
| Maleic anhydride modified ethylene-butene copolymer | [wt parts] |  |  |  |  | 100 |
| 3,3'-diaminodiphenyl sulfone | [wt parts] |  |  | 1.2 | 1.0 | 1.0 |
| Tris(2-hydroxyethyl)isocyanurate | [wt parts] | 2.1 |  |  |  |  |
| 3-amino-1,2,4-triazole | [wt parts] |  | 2.1 |  |  |  |
| Total | [wt parts] | 273.1 | 273.1 | 252.2 | 232 | 232 |
| Amount of modified rubber based on 100 parts by weight of polyamide resin | [wt parts] | 140 | 140 | 120 | 100 | 100 |
| Amount of compound (D) based on 100 parts by weight of polyamide resin | [wt parts] | 1 | 1 | 1 | 1 | 1 |
| Melt viscosity | [Pa · s] | 1150 | 1140 | 1380 | 1290 | 1250 |
| Morphology |  | Good | Good | Good | Good | Good |
| Mean particle diameter of dispersion phase | [μm] | 0.6 | 0.6 | 0.6 | 0.6 | 0.6 |
| Film formability −20° C. constant strain test | [million times] | Good 720 (pass) | Good 350 (pass) | Good 335 (pass) | Good 240 (pass) | Good 320 (pass) |
| Air permeability | [$10^{-2}$ cc · cm/ cm² · sec · cmHg] | 11.2 (pass) | 11.2 (pass) | 8.2 (pass) | 6.2 (pass) | 6.2 (pass) |

TABLE 3

|  |  | Comp. Ex. 1 | Comp. Ex. 2 | Comp. Ex. 3 | Comp. Ex. 4 | Comp. Ex. 5 | Comp. Ex. 6 | Comp. Ex. 7 |
|---|---|---|---|---|---|---|---|---|
| MPA-1 | [wt parts] | 131 |  | 131 |  |  |  |  |
| MPA-2 | [wt parts] |  | 131 |  | 131 |  |  |  |
| MPA-3 | [wt parts] |  |  |  |  |  |  |  |
| MPA-4 | [wt parts] |  |  |  |  | 130.01 |  |  |
| MPA-5 | [wt parts] |  |  |  |  |  | 136 |  |
| PA-1 | [wt parts] |  |  |  |  |  |  | 130 |
| Maleic anhydride modified ethylene-propylene copolymer | [wt parts] | 100 | 100 | 105 | 105 | 120 | 100 | 105 |
| Maleic anhydride modified ethylene-butene copolymer | [wt parts] |  |  |  |  |  |  |  |
| 3,3'-diaminodiphenyl sulfone | [wt parts] |  |  |  |  |  |  |  |
| Tris(2-hydroxyethyl)isocyanurate | [wt parts] |  |  |  |  |  |  |  |
| 3-amino-1,2,4-triazole | [wt parts] |  |  |  |  |  |  |  |
| Total | [wt parts] | 231 | 231 | 236 | 236 | 250.01 | 236 | 235 |
| Amount of modified rubber based on 100 parts by weight of polyamide resin | [wt parts] | 100 | 100 | 105 | 105 | 120 | 100 | 105 |
| Amount of compound (D) based on 100 parts by weight of polyamide resin | [wt parts] | 1 | 1 | 1 | 1 | 0.01 | 6 | 0 |
| Melt viscosity | [Pa · s] | 1160 | 1210 | 1450 | 1550 | 5940 | 1020 | 6230 |
| Morphology |  | Good | Good | Phase inverse Poor | Phase inverse Poor | Good | Good | Good |

TABLE 3-continued

|  |  | Comp. Ex. 1 | Comp. Ex. 2 | Comp. Ex. 3 | Comp. Ex. 4 | Comp. Ex. 5 | Comp. Ex. 6 | Comp. Ex. 7 |
| --- | --- | --- | --- | --- | --- | --- | --- | --- |
| Mean particle diameter of dispersion phase | [μm] | 0.6 | 0.5 | — | — | 0.5 | 1.2 | 0.4 |
| Film formability |  | Good | Good | Good | Good | Poor | Good | Poor |
| −20° C. constant strain test | [Million times] | 56 (fail) | 82 (fail) | 65 (fail) | 102 (pass) | — | 24 (fail) | — |
| Air permeability | [$10^{-2}$ cc · cm/ cm$^2$ · sec · cmHg] | 6.4 (pass) | 9.6 (pass) | 52 (fail) | 59 (fail) | — | 14.5 (pass) | — |

TABLE 4

|  |  | Comp. Ex. 8 | Comp. Ex. 9 | Comp. Ex. 10 | Comp. Ex. 11 | Ex. 12 | Ex. 13 |
| --- | --- | --- | --- | --- | --- | --- | --- |
| MPA-1 | [wt parts] | 52 |  | 52 |  | 52 |  |
| MPA-2 | [wt parts] |  | 52 |  | 52 |  | 52 |
| Ethylene-vinyl alcohol copolymer | [wt parts] | 60 | 60 | 60 | 60 | 60 | 60 |
| Maleic anhydride modified ethylene-propylene copolymer | [wt parts] | 100 | 100 | 105 | 105 | 120 | 120 |
| Maleic anhydride modified ethylene-butene copolymer | [wt parts] |  |  |  |  |  |  |
| 3,3'-diaminodiphenyl sulfone | [wt parts] |  |  |  |  | 1.2 | 1.2 |
| Tris(2-hydroxyethyl)isocyanurate | [wt parts] |  |  |  |  |  |  |
| 3-amino-1,2,4-triazole | [wt parts] |  |  |  |  |  |  |
| Total | [wt parts] | 212 | 212 | 217 | 217 | 233.2 | 233.2 |
| Amount of modified rubber (B) based on 100 parts by weight of polyamide resin plus ethylene-vinyl alcohol copolymer | [wt parts] | 100 | 100 | 105 | 105 | 120 | 120 |
| Amount of compound (D) based on 100 parts by weight of polyamide resin | [wt parts] | 1 | 1 | 1 | 1 | 1 | 1 |
| Melt viscosity | [Pa · s] | 950 | 1040 | 1420 | 1580 | 1240 | 1380 |
| Morphology |  | Good | Good | phase inverse Poor | Phase inverse Poor | Good | Good |
| Mean particle diameter of dispersion phase | [μm] | 1.1 | 1.2 | — | — | 1.1 | 1.1 |
| Film formability |  | Good | Good | Good | Good | Good | Good |
| −20° C. constant strain test | [Million times] | 26 (fail) | 36 (fail) | 44 (fail) | 56 (fail) | 125 (pass) | 156 (pass) |
| Air permeability | [$10^{-12}$ cc · cm/ cm$^2$ · sec · cmHg] | 0.6 (pass) | 1.0 ((pass) | 42 (fail) | 48 (fail) | 0.8 (pass) | 1.1 (pass) |

|  |  | Ex. 14 | Ex. 15 | Ex. 16 | Ex. 17 | Ex. 18 | Ex. 19 |
| --- | --- | --- | --- | --- | --- | --- | --- |
| MPA-1 | [wt parts] | 52 | 52 | 52 | 52 | 52 | 52 |
| MPA-2 | [wt parts] |  |  |  |  |  |  |
| Ethylene-vinyl alcohol copolymer | [wt parts] | 60 | 60 | 60 | 60 | 60 | 60 |
| Maleic anhydride modified ethylene-propylene copolymer | [wt parts] | 140 | 140 | 140 | 160 | 100 |  |
| Maleic anhydride modified ethylene-butene copolymer | [wt parts] |  |  |  |  |  | 100 |
| 3,3'-diaminodiphenyl sulfone | [wt parts] | 1.4 |  |  | 1.4 | 1.0 | 1.0 |
| Tris(2-hydroxyethyl)isocyanurate | [wt parts] |  | 2.1 |  |  |  |  |
| 3-amino-1,2,4-triazole | [wt parts] |  |  | 2.1 |  |  |  |
| Total | [wt parts] | 253.4 | 254.1 | 254.1 | 273.4 | 213 | 213 |
| Amount of modified rubber (B) based on 100 parts by weight of polyamide resin plus ethylene-vinyl alcohol copolymer | [wt parts] | 140 | 140 | 140 | 160 | 100 | 100 |
| Amount of compound (D) based on 100 parts by weight of polyamide resin | [wt parts] | 1 | 1 | 1 | 1 | 1 | 1 |
| Melt viscosity | [Pa · s] | 1650 | 1380 | 1350 | 1780 | 840 | 830 |
| Morphology |  | Good | Good | Good | Good | Good | Good |
| Mean particle diameter of dispersion phase | [μm] | 1.2 | 1.1 | 1.2 | 1.3 | 1.1 | 1.1 |
| Film formability |  | Good | Good | Good | Good | Good | Good |
| −20° C. constant strain test | [Million times] | 184 (pass) | 240 (pass) | 185 (pass) | 260 (pass) | 115 (pass) | 185 (pass) |
| Air permeability | [$10^{-12}$ cc · cm/ cm$^2$ · sec · cmHg] | 1.5 (pass) | 1.5 (pass) | 1.5 (pass) | 2.1 (pass) | 0.6 (pass) | 0.6 (pass) |

In the thermoplastic resin compositions (Examples 1 to 9) of the present invention, the melt viscosity was low; the morphology was good, film formation was possible, and the compositions passed both −20° C. constant strain test and air permeability. In Comparative Examples 1 to 7, the hydrogen bonding compound (C) was not added, and thus the modified rubber having an acid anhydride group or an epoxy group was not modified with the hydrogen bonding compound (C). Comparative Examples 1 and 2 failed the −20° C. constant strain test. Comparative Examples 3 and 4 failed the air permeability test due to inverted phase. A comparison between Examples 1 and 2 and Comparative Example 3 shows that a larger amount of the modified rubber can be added by modifying the modified rubber having an acid anhydride group or an epoxy group with the hydrogen bonding compound (C). In addition, a comparison between Example 8 and Comparative Example 1 shows that the low temperature resistance can be improved by modifying the modified rubber having an acid anhydride group or an epoxy group with the hydrogen bonding compound (C). Comparative Example 7 that used neither the compound (D) capable of bonding to a terminal amino group of the polyamide resin nor the hydrogen bonding compound (C) and Comparative Example 5 that used a small amount of the compound (D) capable of bonding to a terminal amino group of the polyamide resin and did not use the hydrogen bonding compound (C) exhibited high melt viscosity, resulting in the failure of film formation. Comparative Example 6 that used a large amount of the compound (D) capable of bonding to a terminal amino group of the polyamide resin and did not use the hydrogen bonding compound (C) failed the −20° C. constant strain test.

In the thermoplastic resin compositions of the present invention including the ethylene-vinyl alcohol copolymer (E) (Examples 10 to 17), the melt viscosity was low; the morphology was good; film formation was possible; and the compositions passed both of the −20° C. constant strain test and the air permeability. In Comparative Examples 8 to 11, since the hydrogen bonding compound (C) was not added, the modified rubber having an acid anhydride group or an epoxy group was not modified. Comparative Examples 8 and 9 failed the −20° C. constant strain test due to inverted phase, and Comparative Examples 10 and 11 failed the −20° C. constant strain test and the air permeability test due to inverted phase. A comparison between Examples 10, 12 and 15 and Comparative Example 10 shows that a larger amount of the modified rubber can be added by modifying the modified rubber having an acid anhydride group or an epoxy group with the hydrogen bonding compound (C). In addition, a comparison between Example 16 and Comparative Example 8 shows that the low temperature resistance can be improved by modifying the modified rubber having an acid anhydride group or an epoxy group with the hydrogen bonding compound (C).

INDUSTRIAL APPLICABILITY

The thermoplastic resin composition of the present invention can be used as various kinds of hoses, in addition to tires, particularly pneumatic tires, and as other rubber products involved in permeability control of various gases (fumes, air and the like), for example, laminate materials used for fenders, rubber bags, fuel tanks and the like.

The invention claimed is:

1. A thermoplastic resin composition comprising a modified polyamide resin (A') and a modified rubber (B) having an acid anhydride group or an epoxy group, wherein the modified polyamide resin (A') is a polyamide resin modified with 0.05 to 5 parts by weight, based on 100 parts by weight of the polyamide resin, of a compound (D) that bonds to a terminal amino group of the polyamide resin; and the modified rubber (B) having an acid anhydride group or an epoxy group is modified with a hydrogen bonding compound (C) having a functional group reacting with the acid anhydride group or epoxy group of modified rubber (B) and a functional group capable of hydrogen bonding with an amide bond or a hydroxyl group, wherein the hydrogen bonding compound (C) has a hydroxyl group as the functional group reacting with an acid anhydride group or an epoxy group and has a hydroxyl group or a nitrogen-containing heterocycle as the functional group capable of hydrogen bonding with an amide bond or a hydroxyl group and wherein the hydrogen bonding compound (C) is tris (2-hydroxyethyl) isocyanurate and (C) is present in the composition of the final product but has already reacted with (B); wherein the modified rubber (B) having an acid anhydride group or an epoxy group is not modified with a compound having two or more amino groups, and wherein the modified rubber (B) is dispersed in a matrix of the modified polyamide resin (A') and an interface between the matrix of the modified polyamide resin (A') and a dispersion phase of the modified rubber(B) is reinforced by a hydrogen bond; and wherein the thermoplastic resin composition has a sea-island structure, wherein the modified rubber (B) is an island phase within the thermoplastic resin composition.

2. The thermoplastic resin composition according to claim 1, further comprising an ethylene-vinyl alcohol copolymer (E).

3. The thermoplastic resin composition according to claim 1, wherein the compound (D) that bonds to a terminal amino group of the polyamide resin is a monofunctional epoxy compound.

4. The thermoplastic resin composition according to claim 1, wherein the polyamide resin is nylon 6 or nylon 666.

5. The thermoplastic resin composition according to claim 1, wherein a rubber forming the modified rubber (B) having the acid anhydride group or the epoxy group is an ethylene-α-olefin copolymer, an ethylene-unsaturated carboxylic acid copolymer or a copolymer of ethylene and alkyl unsaturated carboxylate.

6. The thermoplastic resin composition according to claim 1, comprising 100 parts by weight of the modified polyamide resin (A') and 90 to 180 parts by weight of the modified rubber (B) having an acid anhydride group or an epoxy group.

7. The thermoplastic resin composition according to claim 2,
wherein a ratio by weight between the modified polyamide resin (A') and the ethylene-vinyl alcohol copolymer (E) is 90/10 to 10/90, and the composition comprises 90 to 180 parts by weight of the modified rubber (B) having an acid anhydride group or an epoxy group, based on 100 parts by weight in total of the modified polyamide resin (A') and the ethylene-vinyl alcohol copolymer (E).

8. A laminate comprising at least one film of the thermoplastic resin composition according to claim 1 and at least one sheet of a diene component-containing rubber composition.

9. The laminate according to claim 8, further comprising an adhesive layer.

10. The laminate according to claim 8, wherein a polymer component of the rubber composition comprises 30 to 100 percent by weight of a halogenated butyl rubber.

11. A tire comprising a film of the thermoplastic resin composition according to claim 1.

12. A hose comprising a film of the thermoplastic resin composition according to claim 1.

13. A tire comprising the laminate according to claim 8.

14. A hose comprising the laminate according to claim 8.

15. The thermoplastic resin composition according to claim 2, wherein the polyamide resin is nylon 6 or nylon 666.

16. The thermoplastic resin composition according to claim 3, wherein the polyamide resin is nylon 6 or nylon 666.

* * * * *